S. W. CORBIN, OF BAINBRIDGE, NEW YORK.

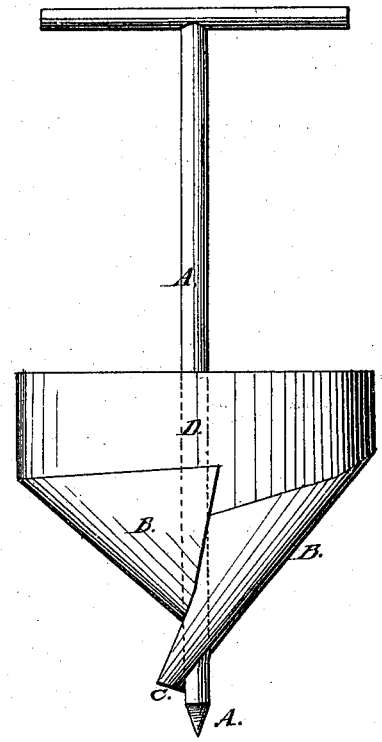

*Letters Patent No. 87,470, dated March 2, 1869.*

IMPROVEMENT IN POST-HOLE AUGERS.

*The Schedule referred to in these Letters Patent and making part of the same.*

*To all whom it may concern:*

Be it known that I, S. W. CORBIN, of Bainbridge, in the county of Chenango, and in the State of New York, have invented certain new and useful Improvements in Post-Hole Augers; and do hereby declare that the following is a full, clear, and exact description thereof, reference being had to the accompanying drawings, and to the letters of reference marked thereon.

The nature of my invention consists in the construction of a post-hole auger, which will be hereinafter fully set forth.

In order to enable others skilled in the art to which my invention appertains, to make and use the same, I will now proceed to describe its construction and operation, referring to the annexed drawings, which form a part of this specification, and which represent a side elevation of my invention.

A is the handle, which is pointed at the lower end.

B is a circular, spiral-ascending flange, encircling the handle, and expanding at the top, giving the size of the hole, and having at the bottom a slightly-projecting lip, C, to assist in its penetrating downward.

The upper edge of the flange B is surmounted by a rim, or curb, D, for the purpose of giving strength, as well as clearing out the loose earth.

Having thus fully described my invention,

What I claim as new, and desire to secure by Letters Patent, is—

The combination of the handle A, flange B, lip C, and rim D, all constructed and arranged substantially as and for the purposes herein set forth.

In testimony that I claim the foregoing, I have hereunto set my hand, this 18th day of December, 1868.

S. W. CORBIN.

Witnesses:
 EZRA P. CHURCH,
 CHAUNCEY NEWELL.